US 7,774,782 B1

(12) United States Patent
Popescu et al.

(10) Patent No.: US 7,774,782 B1
(45) Date of Patent: Aug. 10, 2010

(54) LIMITING REQUESTS BY WEB CRAWLERS TO A WEB HOST

(75) Inventors: Catalin T. Popescu, Mountain View, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 1305 days.

(21) Appl. No.: 10/742,398

(22) Filed: Dec. 18, 2003

(51) Int. Cl.
G06F 9/46 (2006.01)
G06F 15/16 (2006.01)

(52) U.S. Cl. ...................... 718/104; 709/202
(58) Field of Classification Search ............... 718/103; 709/229, 223, 104; 707/206; 705/1
See application file for complete search history.

(56) References Cited

U.S. PATENT DOCUMENTS

| | | | | |
|---|---|---|---|---|
| 6,003,060 | A * | 12/1999 | Aznar et al. | 718/103 |
| 6,263,350 | B1 * | 7/2001 | Wollrath et al. | 707/206 |
| 6,285,999 | B1 | 9/2001 | Page | 707/5 |
| 6,950,874 | B2 * | 9/2005 | Chang et al. | 709/229 |
| 7,047,491 | B2 * | 5/2006 | Schubert et al. | 715/256 |
| 7,260,543 | B1 * | 8/2007 | Saulpaugh et al. | 705/1 |
| 2002/0073188 | A1 * | 6/2002 | Rawson, III | 709/223 |
| 2003/0061260 | A1 * | 3/2003 | Rajkumar | 709/104 |

OTHER PUBLICATIONS

Brin, S., et al., "The Anatomy of a Large-Scale Hypertextual Web Search Engine," In Proc. of the 7th Int'l World Wide Web Conf., 1998.
Haveliwala, T.H., "Topic-Sensitive PageRank," In Proc. of the 11th Int'l World Wide Web Conf., May 2002.
Jeh, G., et al., "Scaling Personalized Web Search," In Proc. of the 12th Int'l World Wide Web Conf., 2003.
Kamvar, S.D., et al., "Exploiting the Block Structure of the Web for Computing PageRank," Stanford Univ. Technical Report, 2003.
* cited by examiner

*Primary Examiner*—Meng-Ai An
*Assistant Examiner*—Eric C Wai
(74) *Attorney, Agent, or Firm*—Morgan, Lewis & Bockius LLP

(57) ABSTRACT

A host load server balances a web host's load capacity among multiple competing web crawlers of a search engine. The host load server establishes a lease for each pair of requesting web crawler and requested web host. The lease expires at a scheduled time. If the web crawler completes its mission of retrieving documents from the web host prior to the expiration of the lease, the host load server releases the load capacity allocated to the web crawler and makes it available for other competing web crawlers. If the web crawler submits a request for renewing its lease with the web host at the scheduled time, the host load server allocates another share of load capacity to the web crawler. If the web crawler does not submit any request at the scheduled time, the host load server terminates the lease and releases the load capacity for other web crawlers.

27 Claims, 9 Drawing Sheets

| Host ID | Maximum Capacity |
|---|---|
| Host 1 | 7 |
| Host 2 | 15 |
| . | . |
| . | . |
| . | . |
| Default | 1 |

| Crawler ID | Priority |
|---|---|
| Main | 10 |
| News | 8 |
| ... | ... |
| Art | 4 |

LIMITING REQUESTS BY WEB CRAWLERS TO A WEB HOST

FIELD OF THE INVENTION

The present invention relates generally to the field of a search engine in a computer network system, in particular to system and method of allocating a web host's load capacity among multiple competing web crawlers.

BACKGROUND OF THE INVENTION

A search engine system is essentially a distributed database system. It provides a powerful source of indexed documents from the Internet (or an Intranet). On the front end of a search engine, a user submits a search query that usually comprises two or three keywords suggesting the user's search interest. In response, the search engine returns a series of links to documents that match the search query in accordance with a set of predefined search criteria. On the backend, the search engine employs web crawlers that retrieve content of hundreds of millions of web pages stored in various web hosts.

A web crawler, also known as a spider or a wanderer, is a special software program that automatically traverses the Internet. The capacity of a web crawler, i.e., the number of documents crawled by a web crawler per unit time, is limited by the computer hardware resources (for example, disk space and network bandwidth) available for the crawler. To reduce the time interval between two adjacent visits to a web page by a web crawler and thereby improve the freshness of search results, a search engine often fragments the Internet into multiple sub-spaces and dispatches multiple web crawlers to crawl the Internet simultaneously, each web crawler responsible for accessing one of the sub-spaces.

One approach of fragmenting the Internet is to group web pages at different web hosts into different categories according to their contents. For example, a "news" category may include web pages whose contents are closely related to news and an "education" category may contain web pages that are deemed to be related to education. Accordingly, one or more news web crawlers are directed to crawl web pages in the "news" category and a certain number of education web crawlers are devoted to dealing with those web pages in the "education" category.

It is quite common that a web host may store web pages belonging to multiple categories. For instance, a web portal like www.yahoo.com often has one sub-directory like education.yahoo.com storing education-related information and another sub-directory like news.yahoo.com storing news-oriented information. As a result, there can be multiple web crawlers associated with different categories submitting document retrieving requests to a web host simultaneously, each request competing against other requests for the resources (load capacity) of the web host.

On the other hand, the load capacity of a web host is often limited by the web host's hardware setup. When the simultaneous requests for load capacity from various web crawlers are above the maximum load capacity a web host can provide, it is almost certain that some of the competing web crawlers will receive slow service from the web host, and some requests may even fail. Such phenomenon is sometimes referred to as "load capacity starvation" for a web crawler. Load capacity starvation prevents web crawlers from retrieving documents from a web host and passing them to an indexer in a timely fashion, which adversely affects both the web host and the freshness of search results generated by the search engine.

Another problem with the fragmentation strategy discussed above is that the interaction between web crawlers and web hosts is a highly dynamic process. The amount of load capacity that a web crawler requires of a particular web host may vary significantly over time, and even from minute to minute. Therefore a permanent or long term grant of load capacity for a particular web host to a particular web crawler is likely to be inefficient and may prevent other web crawlers from obtaining needed load capacity.

SUMMARY

A system for balancing a web host's load capacity among multiple competing web crawlers of a search engine receives from a plurality of web crawlers a stream of capacity requests for a plurality of web hosts. Each web host has an associated maximum load capacity—representing the maximum number of document requests that the web crawlers may collectively issue to the web host during each unit of time (e.g., a maximum number of requests per minute). For each pair of requesting web crawler and requested web host, the system creates a lease between the web host and the web crawler. The lease includes an identity of the web crawler, an identity of the web host, a load capacity allocated to the web crawler and a scheduled time.

The load capacity allocated to a requesting web crawler is based on its fair share of the web host's load capacity as a function of the web crawler's priority and a requested web host's unallocated load capacity. The priority of a web crawler, which may be assigned (for example) by a system administrator, represents a weight of the web crawler's capacity request for a web host relative to weights of other competing web crawlers' capacity requests for the same web host. The priority of a web crawler can be time-variant and its magnitude can be adjusted through a system setup procedure.

The scheduled time of a lease may have different meanings in different scenarios. When a requesting web crawler is granted zero load capacity with respect to a particular web host, or a value smaller than its fair share, the scheduled time of the lease is a callback time at which the web crawler submits a new capacity request for its fair share. When the web crawler receives its fair share of a web host's load capacity, the scheduled time is a lease update time. The web crawler is required to submit a lease renewal request by the lease update time in order to avoid losing its lease with the web host. If the web crawler does not submit any request by the lease update time, the load capacity allocated to the web crawler may be automatically reduced by the system, and if the web crawler does not submit a request for a lease update by an associated lease expire time, the load capacity allocated to the web crawler may be revoked entirely.

If a web crawler completes its mission of retrieving documents from a web host prior to the expiration of its lease with the web host, the web crawler may submit an explicit request to release the load capacity that has been granted to the web crawler.

BRIEF DESCRIPTION OF THE DRAWINGS

Embodiments of the invention are described below in conjunction with the drawings.

Like reference numerals refer to corresponding parts throughout the several views of the drawings.

DESCRIPTION OF EMBODIMENTS

The present invention relates to a system and method of dynamically allocating a web host's load capacity among multiple competing web crawlers. One goal of the system and method is to avoid overloading any web host with more document requests than it can timely handle. Another goal of the system and method is to avoid document download delays when the web crawlers download documents from the web host.

Figure 1:
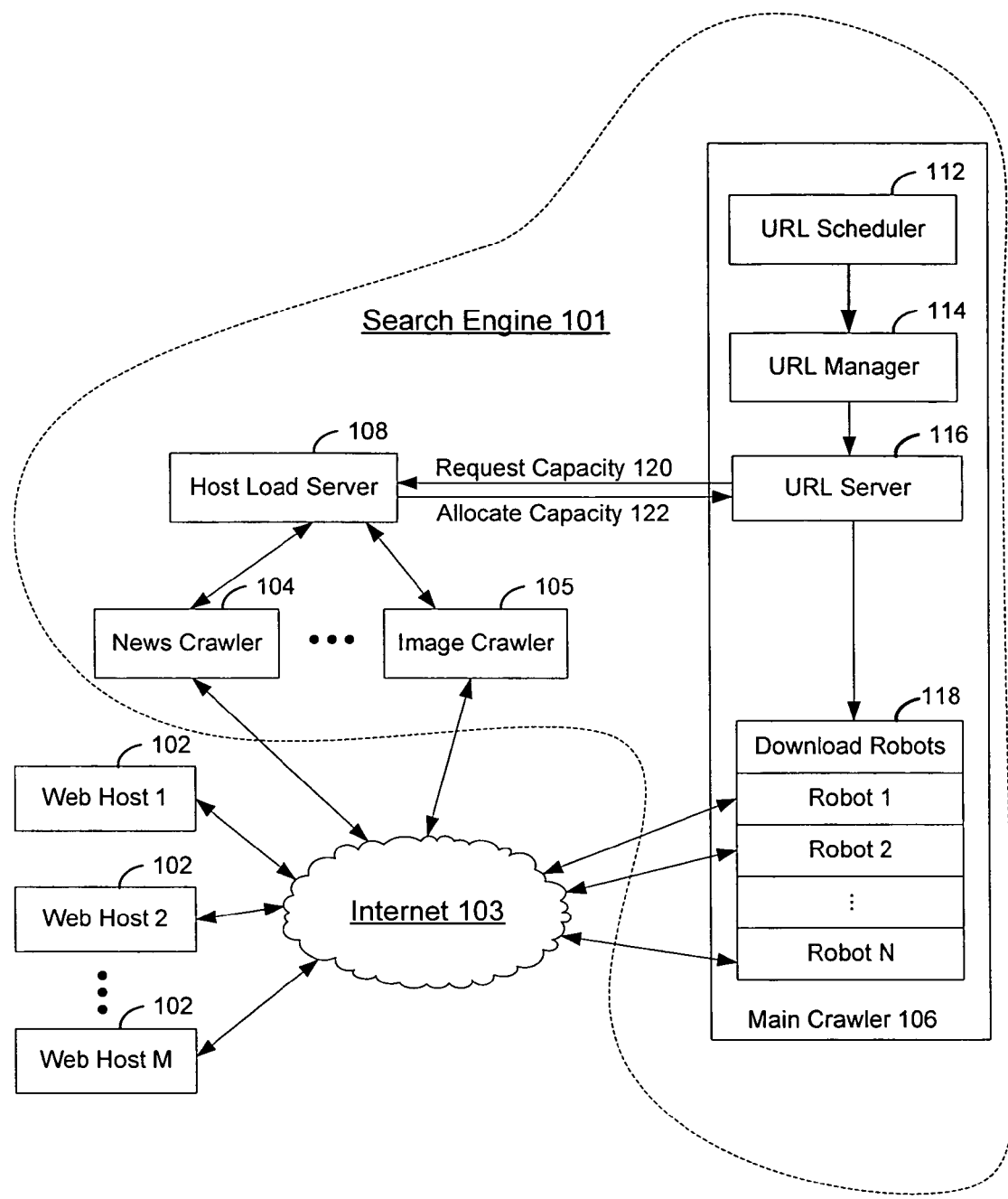
FIG. 1 illustrates a network environment comprising a search engine and a plurality of web hosts.

FIG. 1 illustrates a network environment comprising a search engine 101 and a plurality of web hosts 102. The search engine 101 and the web hosts 102 are connected to each other through the Internet 103. Each web host 102 has an associated or assigned load capacity, e.g., the number of download requests it is able to handle per unit time. The search engine 101, or more specifically, the backend of the search engine 101, comprises one or more web crawlers (for example, News crawler 104, Image crawler 105 and Main crawler 106) and a host load server 108. Each of the web crawlers, taking News crawler 104 as an example, maintains a list of URLs (not shown) provided by the search engine 101 within a given period of time. For each URL in the list, News crawler 104 submits a download request to a web host 102 through the Internet 103. The web host 102, in response, returns a document associated with the URL to News crawler 104 for further processing, such as indexing.

Since a web host 102 has a limited load capacity, the search engine 101 needs a mechanism to control the rate of download requests submitted by different web crawlers to the web host. Within the search engine 101, this requirement means that the rate of document download at a web crawler with respect to a particular web host should be no greater than a certain level, and therefore the web crawler should only maintain a URL list of limited size. The host load server 108 according to the present invention is the desired mechanism in the search engine 101 responsible for allocating an appropriate share of a web host's load capacity among multiple web crawlers competing for the web host's limited load capacity.

Referring again to FIG. 1, a web crawler like Main crawler 106 may further comprise a URL scheduler 112, a URL manager 114, a URL server 116 and a plurality of download robots 118. In one embodiment, the URL scheduler 112 determines which URLs will be crawled for a given period of time and passes them to the URL manager 114. The URL manager 114 investigates the status of the URLs passed by the URL scheduler 112, e.g., their page ranks, and then prioritizes them for crawling. For example, a URL of higher page rank is given a higher priority so that it will be crawled before other URLs of lower page ranks. The URL server then distributes the prioritized URLs to respective download robots 118. A robot 118 uses various protocols (e.g., HTTP, HTTPS, gopher, File Transfer Protocol, etc.) to download documents associated with the URLs from respective web hosts. A more complete explanation of the URL distribution among different web crawlers is found in U.S. Patent Application "Anchor Tag Indexing in a Web Crawler System", Ser. No. 10/614,133, filed Jul. 3, 2003, which is hereby incorporated by reference in its entirety.

Prior to distributing the prioritized URLs to the robots 118, the URL server 116 needs to determine the maximum number of URL requests to be sent to a web host. It does this by making a procedure call to the host load server 108. The host load server 108 stores information for each known web host (i.e., a server storing documents known to the search engine 101) indicating the maximum load capacity available for the entire search engine 101 and the portion of that load capacity which is currently in use or reserved by different web crawlers.

The URL server 116 sends a load capacity request 120 to the host load server 108, asking for the right to send download requests to a specified web host at a certain rate. In response, the host load server 108 allocates a share of the specified web host's load capacity 122 to the URL server 116. In other words, the URL server 116 will be told how many URLs it can send to its robots 118 for downloading per unit time. Accordingly, the URL server 116 parcels out the proper number of prioritized URLs to different robots 118. The robots 118 then take these URLs and download (or at least attempt to download) the documents at those URLs.

Figures 2, 3A, 3B:
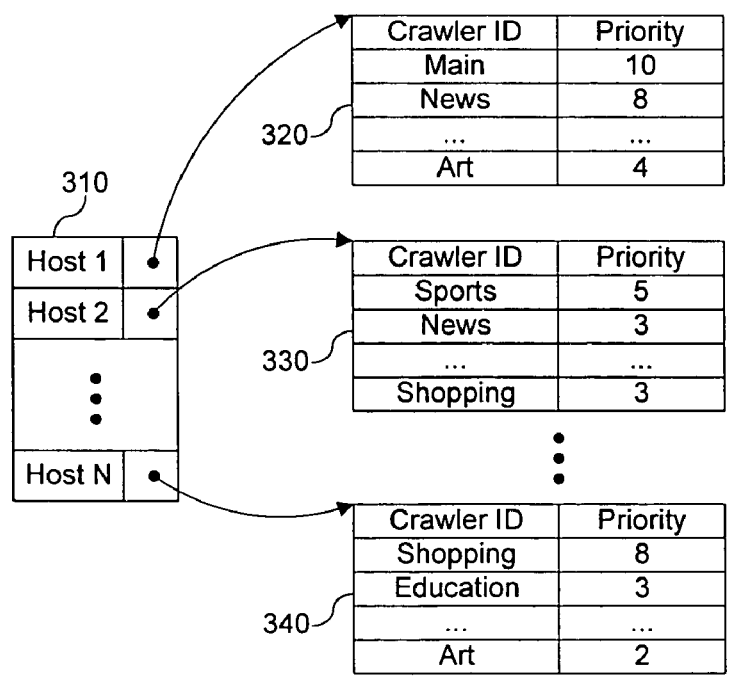
FIG. 2 is a host load capacity table stored in a host load server.
FIG. 3A is a web crawler priority table, each web crawler having a single priority that applies to any web host it attempts to crawl.
FIG. 3B is a web crawler priority table, each web crawler having multiple priorities with respect to multiple hosts or groups of hosts.

FIGS. 2-5 are data structures in the host load server 108 storing various information that is used for allocating a web host's load capacity among competing web crawlers. Specifically, FIG. 2 is a host load capacity table 200. For each web host known to the search engine 101, there is a corresponding entry in this table indicating the web host's maximum load capacity. In one embodiment, the web hosts are approximately divided into two categories, unusual load capacity category 210 and usual load capacity category 220. In some embodiments, a web host is qualified as a member in the unusual load capacity category 210 if it has a load capacity higher or lower than a predetermined default value. Otherwise, the web host is deemed as a member in the usual load capacity category 220. A web host is qualified as a member of the unusual load capacity category 210 if it has a load capacity higher than a first predetermined threshold or lower than a second predefined threshold. Otherwise, the web host is deemed as a member in the usual load capacity category 220.

Every web host in the unusual load capacity category 210 has a unique entry in the host load capacity table 200 that includes a unique host ID assigned to the web host and a specific amount of load capacity associated with the web host. For example, a web host having ID "Host 1" is a member in the unusual load capacity category 210 and its maximum load capacity is 7. In contrast, the web hosts in the usual load capacity category 220 all correspond to the same entry or the last entry in the host load table having a default load capacity. While the default load capacity is shown as "1" in table 200, the specific default value may be any appropriate value for the search engine and web hosts. The determination of which web hosts require entries in the host load capacity table 200 is based on knowledge about the web hosts, including their bandwidth for handling requests, and also requests from some web hosts (e.g., the webmasters of those web hosts) to reduce the load imposed by the web crawlers on those web hosts (e.g., a web host's webmaster may request that the number of URLs downloaded from a web host be limited to X URLs per hour, where X is a value specified by the web host's webmaster.)

In some embodiments, priority values are assigned to the web crawlers by a system administrator. FIG. 3A depicts a web crawler priority table 300 in which each web crawler is assigned a specific value indicating its relative priority as compared with priorities of other web crawlers. For instance, if a News crawler has a priority of 10 and a Main crawler has a priority of 8, then when both crawlers request an allocation of load capacity, the News crawler will typically be allocated about 25% more load capacity than the Main crawler. A default value, specified either in the priority table 300 or elsewhere is assigned to each web crawler not specifically identified by an entry in the table 300. In some embodiments, each web crawler is assigned a single priority that applies to any web host it attempts to crawl. However, in some other embodiments, each web crawler may be assigned multiple priorities with respect to multiple hosts or groups of hosts. A data structure for this is shown in FIG. 3B, in which a web crawler priority table 310 maps various web hosts to priority tables 320, 330 and 340, each of which lists a set of crawler priorities for the web host or hosts linked to the respective priority table. Multiple web hosts may reference the same priority table (e.g., 330), and web hosts not listed in table 310 are assigned a default priority table (e.g., priority table 300).

When the host load server grants a particular web crawler a share of a web host's load capacity, it generates a lease between the two parties and stores the lease in a host load capacity allocation table. In some embodiments, a lease includes at least an identity of the web crawler, an identity of the web host, a load capacity allocated to the web crawler and a scheduled time. When the scheduled time is up, the lease may be extended or terminated depending on the specific status of the lease. A more detailed discussion about the scheduled time is provided below in connection with FIGS. 5 and 6.

Figure 4:
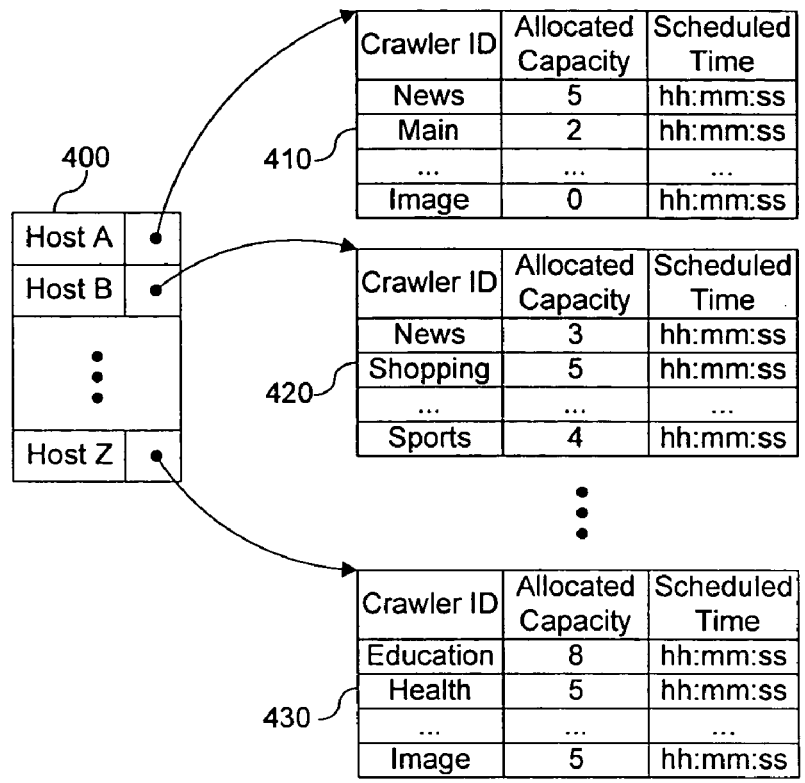
FIG. 4 is a data structure stored in the host load server that comprises a plurality of load capacity leases between web hosts and web crawlers.

FIG. 4 depicts a host load capacity allocation table 400 in accordance with some embodiments. This table is essentially a snapshot of the load capacity distribution at various web hosts that are being visited by a search engine's multiple web crawlers at a particular moment. FIG. 4 suggests that a web host may simultaneously maintain multiple leases with different web crawlers at the same time. For instance, table 410 associated with Host A contains at least three leases, one with News crawler, one with Main crawler and one with Image crawler. In particular, the load capacity allocated to Image crawler happens to be zero, suggesting that a lease does not guarantee that a web crawler has acquired its fair share or even any non-trivial share of a web host's load capacity. In other words, a lease simply means that a web crawler has registered at the host load server and the host load server has acknowledged the existence of the load capacity request for a particular web host. If a web crawler like Image crawler initially receives a zero share of load capacity, because all available capacity is already allocated, the crawler will typically receive a non-zero allocation when it renews its request at the scheduled time indicated in the host load capacity allocation table 400.

As suggested above, a lease between a web crawler and a web host establishes that the web crawler is granted a certain amount of the web host's load capacity for a time period that ends at the scheduled time indicated in the corresponding lease entry in the host load capacity allocation table 400. During this time period, the web crawler is able to submit a certain number of download requests to the web crawler according to its granted load capacity. When the scheduled time is up, the web crawler has to either renew the lease or surrender its granted load capacity at least partially so as to avoid the phenomenon of load capacity starvation discussed above.

Figure 5:
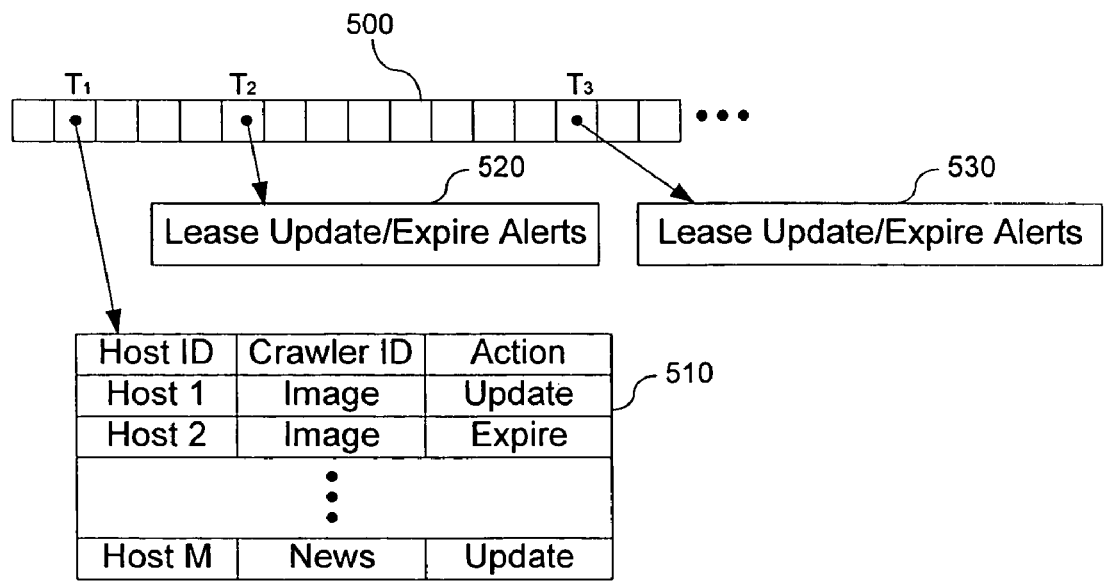
FIG. 5 is a data structure stored in the host load server for storing information used by the host load server to manage the plurality of leases.

FIG. 5 illustrates a timeline data structure that stores information identifying specific actions that are scheduled to be taken by the host load server. The timeline data structure is a one-dimensional array 500, each component or entry of the array corresponding to one particular time along the timeline. In one embodiment, there is a fixed time interval, e.g., one second, between two adjacent components. Each component corresponding to a time at which at least one event is scheduled includes a pointer to a table of alerts 510, 520, 530. Each alert identifies an action to be taken by the host load server, which generally corresponds to a scheduled change in status of a load reservation by a web crawler. An alert is triggered when the current time matches the time associated with the component in which the alert is stored. It is noted here that in normal operation the host load server inserts alerts into the timeline data structure primarily as a precaution against failures by the web crawlers to renew or cancel their web host load capacity leases in a timely fashion. So long as all the web crawlers timely renew or cancel all their web host load capacity leases, the alerts identified in the timeline data structure are canceled prior to their being triggered. Mechanisms for inserting alerts, canceling alerts and triggering actions based on the scheduled alerts are described below with reference to FIGS. 7A-7C.

When the host load server generates a lease between a web host and a web crawler, it identifies a first component in the array 500 according to the lease's scheduled time (or lease update time) and inserts a first alert into a table associated with the first component. The first alert identifies a web host (e.g., by specifying the web host's ID), a web crawler (e.g., by specifying the web crawler's ID) and an action or alert type, equal to "update". An "update" alert instructs the host load server to perform certain actions (described below) if this alert is not canceled prior to time associated with the component in which the alert is stored. In some embodiments, the host load server also identifies a second component that is associated with a second scheduled time (or lease expire time) that is several seconds, e.g., 15 seconds, after the first component's scheduled time and inserts a second alert into a table associated with the second component. The second alert identifies the web host and the web crawler associated with the lease that was generated, and also identifies an action or alert type of "expire". The "expire" alert instructs the host load server to terminate the lease at (or short after) the time associated with the alert if the lease had not been renewed or canceled by that time. Terminating lease releases load capacity for use by other competing web crawlers, if any.

The reason for creating alerts in the timeline data structure shown in FIG. 5 is that a web crawler nay not expressly renew or renounce its lease at its scheduled times. This may happen if the web crawler fails or it's functionality deteriorates or is compromised. Normally, however, the web crawler will request a lease renewal if it has any unprocessed URL's corresponding to the lease's web host at the end of lease period (or at a scheduled time shortly before the lease end time). In response, the host load server allocates a new share of the web host's load capacity to this web crawler, generates a new set of lease update and expire alerts in the timeline data structure for the renewed lease and cancels outstanding lease update/expire alerts, if any, based on the pre-renewed lease. Similarly, if the web crawler determines at or before the scheduled end of the lease period that is has no unprocessed URL's for the lease's web host, it will normally submit a lease release to the host load server. In response, the host load server releases from the web crawler its allocated load capacity, making the released load capacity available for other requesting web crawlers, if any, and cancels any outstanding lease update/expire alerts associated with the lease.

Figure 6:
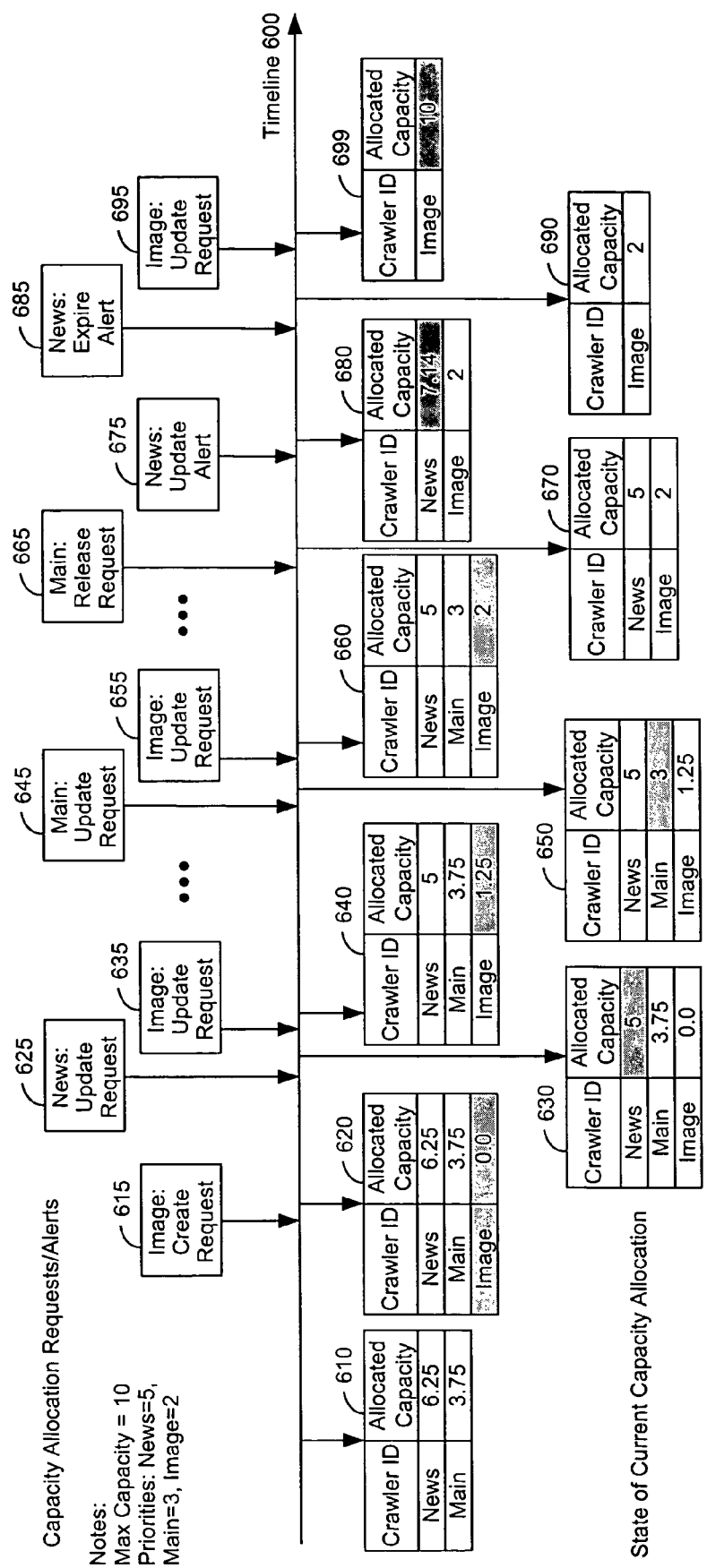
FIG. 6 illustrates how the host load server dynamically distributes a web host's load capacity among multiple web crawlers according to their respective priorities and requests.

For illustrative purposes, FIG. 6 presents an example explaining how a host load server dynamically distributes a web host's load capacity among multiple competing web crawlers based on their explicit requests and/or scheduled alerts stored in the host load server. Assuming that the web host's maximum load capacity is 10 and there are three competing web crawlers whose priorities are 5 (News), 3 (Main) and 2 (Image), respectively. There are initially two existing leases in table 610, one for News crawler and the other for Main crawler. The maximum load capacity of 10 is split into two shares according to the two crawlers' priorities, 6.25 for News crawler and 3.75 for Main crawler.

The first event along the timeline 600 is that Image crawler submits a capacity request 615 to the host load server. A new lease is created in table 620 accordingly for Image crawler. Since the web host's load capacity has been completely booked by the other two existing leases, the new lease ends up with zero load capacity temporarily. To get its fair share of the web host's load capacity, Image crawler needs to call back later at a scheduled time. The scheduled time is usually a small amount of time (e.g., 5 seconds or less) after any of existing leases is scheduled to be updated or expired, because the host load server can re-distribute the web host's load capacity among multiple competing web crawlers only after it updates or expires an existing lease. Thus, the host load server responds to the capacity request 615 by the Image crawler by returning a lease having a load capacity of zero, and a specified callback time. In one embodiment, the callback action is initiated by the Image crawler or the requesting web crawler. In yet another embodiment, the callback action can be triggered by an alert previously stored in the timeline data structure when the lease was created.

Referring back to FIG. 6, News crawler submits a lease update request 625 at a certain time. The host load server uses this opportunity to re-evaluate the load capacity that should be allocated to News crawler. As a result, the share reserved for News crawler drops from 6.25 to 5 due to the newly emerging competition from Image crawler, and therefore a load capacity of 1.25 becomes available (i.e., is temporarily unassigned). As shown in table 630, Image crawler does not inherit the newly released load capacity of 1.25 immediately, because there is no express capacity request from Image crawler yet. Later on, Image crawler's capacity request 635 arrives and the released load capacity (1.25) is granted to Image crawler (table 640). Since Image crawler's fair share of load capacity is 2 (out of 10), higher than the 1.25 it actually receives, the host load server arranges a second callback action for Image crawler following Main crawler's scheduled update/expire alerts. In some embodiments, the lease grant given to Image crawler includes an specified update time, at which time the Image crawler will make a callback with an update request.

After Main crawler submits a lease update request 645, its allocated load capacity is downgraded to 3 (table 650), which is its fair share under the current competition. Accordingly, the released load capacity (0.75) is granted to Image crawler when it submits its capacity update request 655. Table 660 shows that each of the three web crawlers has a share of the web host's load capacity proportional to its associated priority. After crawling all the URLs in its waiting list, Main crawler submits a capacity releasing request 665 to the host load server even though its lease is not due to update or expire. In response, the host load server removes the entry associated with Main crawler from table 670. Optionally, the host load server may cancel any outstanding alert associated with Main crawler's lease since the lease has been terminated. The load capacity (3) released by Main crawler is also available for the two remaining web crawlers to compete.

The first event following Main crawler's capacity releasing request 655 is a lease update alert 675 associated with News crawler, indicating that New crawler has not submitted any express request to renew or renounce its lease yet. There is a possibility that News crawler may have encountered a problem that interrupted its communication with the host load server. The lease update alert 675 triggers the host load server to update News crawler's load capacity. As a result, 2.14 out of the unallocated load capacity of 3 is granted to News crawler (for a total allocation of 7.14) based on News crawler's relative priority (5) over Image crawler's (2). Since this lease update is not initiated by News crawler, the host load server does not create a new set of alerts to extend News crawler's updated lease. Nor would the host load server cancel any outstanding alert associated with the previous lease for the same reason.

After a certain time, e.g., 15 seconds, the lease expire alert 685 associated with News crawler occurs, triggering the host load server to terminate the lease between News crawler and the web host. Table 690 now contains or identifies only one lease, the lease between Image crawler and the web host. Note that the lease's allocated load capacity is still 2 because Image crawler has not submitted a capacity update request since its request 655, and furthermore the host load server has not encountered an alert to update that lease either. Finally, the host load server receives a lease update request 695 from Image crawler, indicating that Image crawler needs more time to finish its job. Since there is no other web crawler competing against Image crawler for the web host's load capacity, all the remaining load capacity (8) is granted to Image crawler. In other words, Image crawler has an exclusive control over the web host's maximum load capacity for a limited period of time, e.g., two minutes, until there is a capacity request from another web crawler or Image crawler explicitly renounces its lease.

Figure 7A:
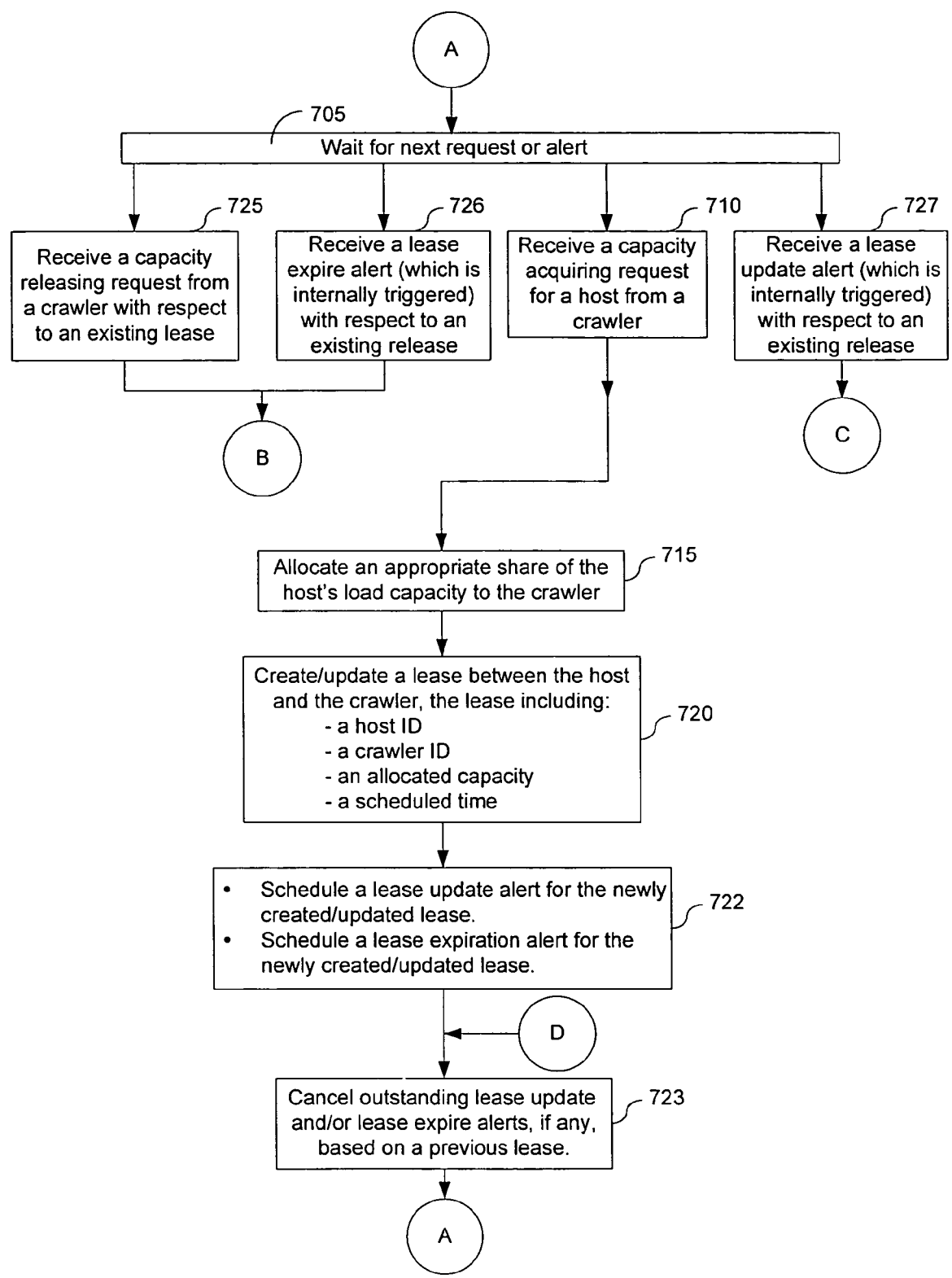
FIG. 7A is a flowchart illustrating how the host load server interacts with multiple web crawlers and processes their capacity requests.
Figure 7B:
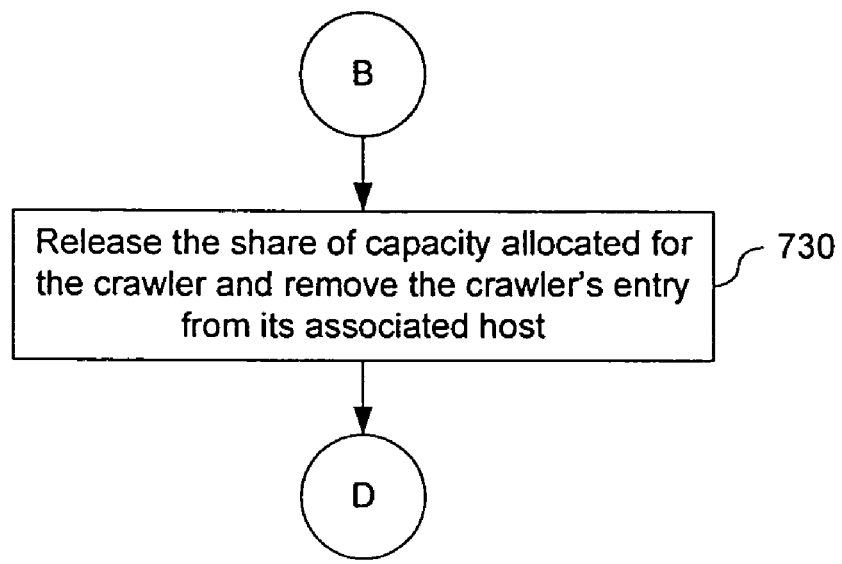
FIG. 7B is a flowchart illustrating how the host load server releases the load capacity allocated to a web crawler in response to a lease expire alert or a capacity releasing request from the web crawler.
Figure 7C:
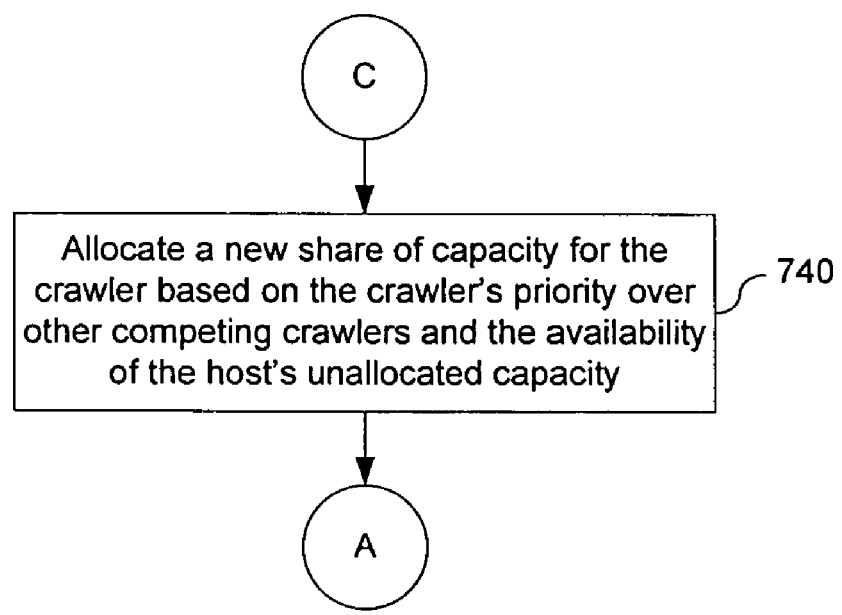
FIG. 7C is a flowchart illustrating how the host load server allocates a new share of a web host's load capacity to a web crawler in response to a lease update alert.

FIGS. 7A-C are a set of flowcharts illustrating the actions performed by the host load server when handling different types of capacity requests or alerts associated with various web crawlers. At step 705 the host load server is in an idle mode, waiting for the arrival of next request from a web crawler or an alert from its timeline data structure. While waiting, the host load server keeps track of the passage of time and at appropriate times reads the current slot of the timeline data structure 500 so as to trigger any alerts corresponding to the current time.

At step 710, the host load server receives a capacity request for a web host from a web crawler. At this moment, there may or may not be a capacity lease existing between the web host and the web crawler. In response, the host load server calculates the web crawler's fair share of the web host's load capacity according to its priority. In one embodiment, a web crawler's fair share is determined as $$\text{FairShare\_i} = \text{Capacity} \cdot \frac{\text{Priority\_i}}{\sum_j \text{Priority\_j}}.$$

However, as suggested above in connection with FIG. 6, a web crawler may not receive its fair share of load capacity initially if most of the web host's load capacity has been granted to other web crawlers that submitted their capacity requests ahead of this web crawler. As a result, the host load server allocates an appropriate share of the web host's load capacity to the web crawler at step 715. In one particular embodiment, the appropriate share is a function of Min(Capacity−Capacity_allocated, FairShare_i, [Capacity_requested]), where the parameter Capacity_allocated refers to the sum of capacity that has been granted to other web crawlers, and the optional parameter Capacity_requested indicates the specific amount of load capacity requested by the web crawler corresponding to index i. For example, the web crawler receives zero load capacity if Capacity_allocated is equal to Capacity. The parameter Capacity_requested is used if the web crawler knows in advance how much load capacity it needs to complete its mission and specifies that parameter in its request.

At step 720, the host load server creates a new lease (if it is the first request from the web crawler) or updates an existing lease (if otherwise) between the web host and the web crawler. Referring back to FIG. 4, in some embodiments a lease includes a host ID, a crawler ID, an allocated load capacity and a scheduled time. The scheduled time determines, for example, when the lease should be renewed per the web crawler's request or effectively how long the web crawler has a complete control of its allocated share of load capacity. At step 722, the host load server schedules a lease update alert and a least expire alert for a newly created or updated lease, for example by storing representations of those alerts in one or more data structures such as the timeline data structure shown in FIG. 6. In some embodiments, the lease expire alert is scheduled to be later than the lease update alert by a predefined period of time, e.g., 15 seconds. These alerts may be useful in the event that the web crawler loses contact with the host load server for any technical reason. At step 723, the host load server cancels outstanding lease update and/or lease expire alerts, if any, based on a previous lease between the web crawler and the web host. This step prevents a lease from having more than one lease update alert or lease expire alert, which would otherwise be the case if the previous lease were updated per the web crawler's express request prior to its expiration.

After step 723, the host load server returns to the idle mode, step 705, where it waits for the arrival of next request from a web crawler or an alert from its timeline data structure. As noted above, while waiting, the host load server keeps track of the passage of time and at appropriate times reads the current slot of the timeline data structure 500 so as to trigger any alerts corresponding to the current time.

At step 725, the host load server receives a capacity releasing request from a web crawler with respect to an existing lease. This may happen if the web crawler completes its download requests prior to the expiration of its lease with a web host. At step 726, the host load server receives a lease expire alert with respect to an existing lease, suggesting that the host load server has not received any express request, be it a renewing or renouncing request, from the web crawler associated with the lease, since the creation or last update of the lease. In either case, the host load server releases the share of load capacity allocated to the web crawler, making it available for other competing web crawlers, and deletes the lease entry from its host load capacity allocation table at step 730 (FIG. 7B). After that, the host load server returns to step 723, removing any outstanding alerts associated with the deleted lease. For example, if the lease is terminated per the web crawler's explicit request at step 725, there are still one or two lease alerts associated with the lease in the timeline data structure. The host load server removes the alert or alerts to avoid false alerts from occurring in the future.

At step 727, the host load server receives a lease update alert with respect to an existing lease, indicating that the host load server has not received a request from the web crawler associated with the lease since the creation or last update of the lease. In response, at step 740 (FIG. 7C) the host load server allocates a new share of load capacity to the web crawler based on the web crawler's priority over other competing web crawlers and the availability of unallocated capacity for the web host associated with the lease. Unlike the process following steps 725 and 726, the host load server here does not return to step 723. Instead, since there is a chance that the web crawler associated with the lease may have run into some problems, the host load server preserves the remaining lease expire alert associated with the lease so as to terminate the lease if there is still no request from the web crawler when the lease expire alert is triggered.

Figure 8:
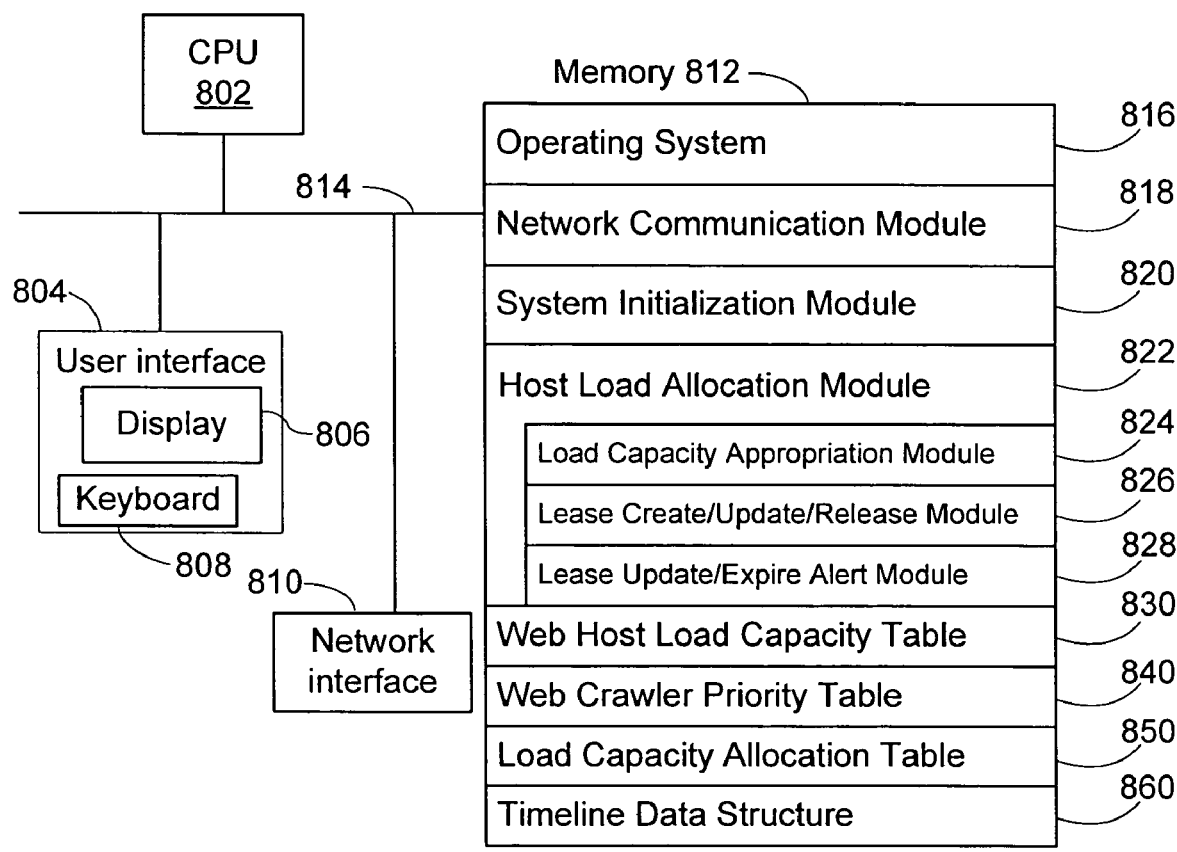
FIG. 8 is a block diagram of a host load server

Referring to FIG. 8, a host load server 800 typically includes one or more processing units (CPU's) 802, one or more network or other communications interfaces 810, memory 812, and one or more communication buses 814 for interconnecting these components. The host load server 800 may optionally include a user interface 804 comprising a display 806 and a keyboard 808. Memory 812 may include high speed random access memory and may also include non-volatile memory, such as one or more magnetic disk storage devices. Memory 812 may include mass storage that is remotely located from the central processing unit(s) 802. The memory 812 preferably stores:

- an operating system 816 that includes procedures for handling various basic system services and for performing hardware dependent tasks;
- a network communication module (or instructions) 818 that is used for connecting the host load server 800 to other servers or computers via one or more communication networks (wired or wireless), such as the Internet, other wide area networks, local area networks, metropolitan area networks, and so on;
- a system initialization module (or instructions) 820 that initializes other modules and data structures stored in memory 812 required for the appropriate operation of host load server 800;
- a host load allocation module (or instructions) 822 for processing capacity requests for a web host, allocating appropriate shares of the web host's load capacity to a plurality of requesting web crawlers and establishing lease update/expire alerts for each lease;
- a host load capacity table 830 for storing the maximum load capacities of a plurality of web hosts;
- a web crawler priority table 840 for storing the priorities of a web crawler relative to other competing web crawlers with respect to each of the plurality of web hosts;

a load capacity allocation table 850 for storing leases between the web crawlers and web hosts; and a timeline data structure for storing lease update/expire alerts associated with respective leases between the web crawlers and web hosts.

The host load allocation module 822 may further comprise:

a load capacity appropriation module (or instructions) 824 for calculating a web crawler's fair share of a web host's load capacity based upon the web crawler's priority and granting an appropriate amount of the load capacity to the web host according to the availability of the web host's load capacity;

a lease create/update/release module (or instructions) 826 for creating a new lease between a requesting web crawler and a requested web host, updating and extending an existing lease by granting the requesting web crawler a new share of load capacity and assigning the lease a new scheduled time, or releasing an existing lease's load capacity allocated to the web crawler and terminating the lease, in accordance with the web crawler's respective requests or alerts associated with the lease; and a lease update/expire alert module (or instructions) 828 for creating or canceling lease update/expire alerts for a newly created or existing lease.

In some embodiments, these modules 824, 826, 828 may be implemented within a single procedure or in a set of procedures that reside within a single software module.

Figure 9:
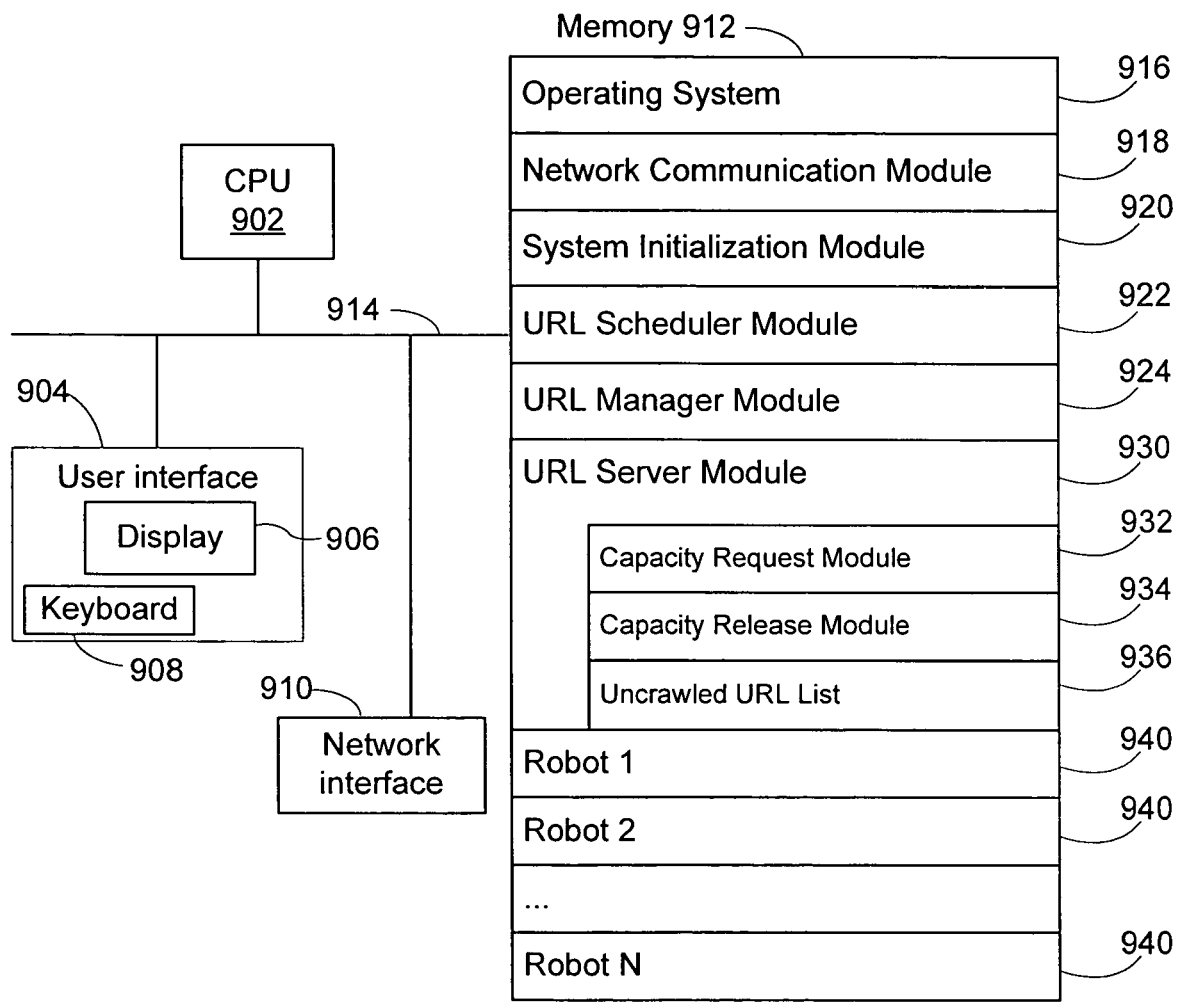
FIG. 9 is a block diagram of a web crawler.

FIG. 9 depicts the internal structure of a web crawler 900 in some embodiments. However, it should be understood that in some embodiments the host load server will work with web crawlers having a variety of other internal structures. For instance, the web crawler 900 may be implemented using multiple servers so as to improve the throughput and reliability of the web crawler 900. For instance, modules 922, 924, 930 and 940 may each be implemented on distinct servers that communicate with and work in conjunction with other ones of the servers in the web crawler 900. Similar to the host load server 800, the web crawler 900 also includes one or more processing units (CPU's) 902, one or more network or other communications interfaces 910, memory 912, and one or more communication buses 914 for interconnecting these components. The memory 912 preferably stores:

- an operating system 916 that includes procedures for handling various basic system services and for performing hardware dependent tasks;
- a network communication module (or instructions) 918 that is used for connecting the web crawler 900 to the host load server 800 and other servers or computers via one or more communication networks (wired or wireless), such as the Internet, other wide area networks, local area networks, metropolitan area networks, and so on;
- a system initialization module (or instructions) 920 that initializes other modules and data structures stored in memory 912 required for the appropriate operation of the web crawler 900;
- a URL scheduler module (or instructions) 922 for determining which URLs will be crawled by the web crawler 900 for a given period of time;
- a URL manager module (or instructions) 924 for investigating the status of the URLs passed by the URL scheduler module 922, e.g., their page ranks, and then prioritizing them for web crawling;
- a URL server module (or instructions) 930 for distributing the URLs prioritized by the URL manager module 924 among multiple download robots 940; and
- a plurality of download robot modules (or set of instructions) 940 for downloading documents associated with the prioritized URLs from respective web hosts using various network protocols.

In embodiments in which the web crawler 900 is implemented using multiple servers, some of the modules or instructions stored in the memory 912 of the web crawler may be stored only in the memory of the server(s) performing the functions associated with that module or set of instructions.

The URL server module 930 further comprises:

- a capacity request module (or instructions) 932 for submitting capacity requests to the host load server 800 and for receiving leases that satisfy the requests from the host load server 800;
- a capacity release module (or instructions) 934 for instructing the host load server 800 to terminate a lease and releasing the load capacity associated with the lease for use by other web crawlers; and
- a list of URLs 936 that need to be processed by the web crawler 900.

Generally speaking, each URL in the URL list 936 is associated with a web host whose address may be uniquely identified from the URL. For example, a URL such as http://156.22.78.39/thesis.pdf suggests that the web host's Internet Protocol (IP) address is 156.22.78.39 and the document waiting to be downloaded, thesis.pdf, is located at the web host's root directory. However, it is more typical that a URL does not contain the IP address of a web host, but only a textual description of the web host, e.g., www.yahoo.com. The textual descriptions of web hosts, even though unique, may cause a problem for host load capacity allocation because multiple URL prefixes may actually point to a same IP address. This is very common in the case that two or more websites are maintained on a same application service provider (ASP).

For instance, suppose that a web crawler is assigned the following two URLs: http://www.xxx.com/aaa.html and http://www.yyy.org/bbb.html, and that the two seemingly different web hosts, www.xxx.com and www.yyy.org, are physically associated with a same web server. In this circumstance, the web crawler groups these web hosts together under a unique group name in order to avoid potential clashes among different robots competing for the limited load capacity allocated to the web crawler. In one embodiment, the web crawler examines the IP address of each web host, and assigns a unique name, e.g., an IP address, to a group of web hosts having a same IP address. In some embodiments, the grouping tables 1010, 1020 are generated and maintained by the URL Server module 930, based on information received from the URL manager module 924 and the robot module(s) 940.

Figure 10:
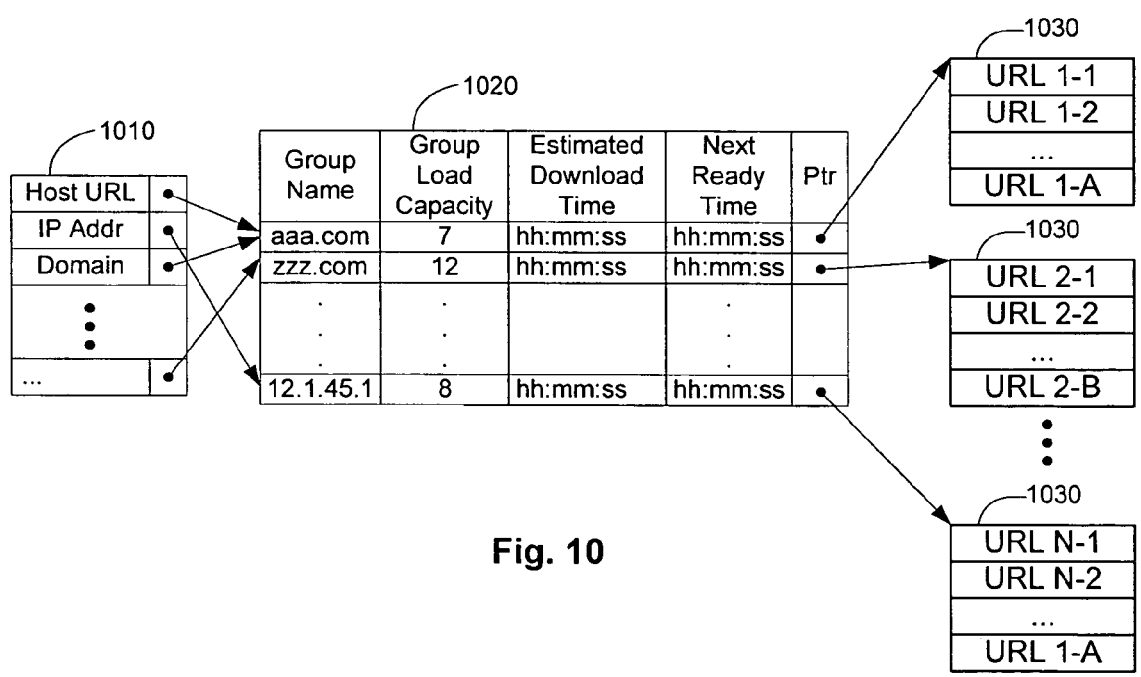
FIG. 10 is a data structure stored in a web crawler that groups various hosts and their associated lists of universal resource locators (URL) into unique groups.

FIG. 10 is a data structure stored in a web crawler that groups various web hosts and their associated lists of URLs into unique groups. Table 1010 includes various forms of expressions for a web host, such as URLs, IP addresses, or domain names. Table 1020 has one entry for each group of web hosts, the entry including a canonical group name, a group load capacity, an estimated download time per document and a next ready time. In some embodiments, the group name is often the IP address of the web hosts in the group. The group load capacity is the load capacity that has been leased to the web crawler for the identified group. The estimated download time per document refers to an average amount of time it takes to download a document from the web host during a predefined recent time period, or for a predefined number of recent downloads from the web host. The next ready time refers to a time at which the web crawler plans to crawl a next URL associated this group. Each of the tables 1030 contains a list of URLs that will be crawled by the web crawler for a respective group. This mechanism enabled the robots to share the group load capacity that has been allocated or leased to the web crawler.

Referring to FIGS. 2 and 10, in some embodiments, the canonical group name for each group of web hosts is used as the host ID in the host load capacity table 200 (shown in FIG. 2). Lease requests from the web crawlers for web hosts that are members of a group specify the group name for the corresponding group.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of limiting requests to a web host by multiple competing web crawlers of a search engine, comprising on a server system:
    receiving from a plurality of web crawlers a stream of capacity requests for a plurality of web hosts, each web host having a specified maximum allowed load level comprising a predefined number of web crawler download requests per unit time;
    for each pair of requesting web crawler and requested web host, creating a lease between the web host and the web crawler, the lease including an identity of the web crawler, an identity of the web host, a load capacity allocated to the web crawler and a lease update time prior to a lease expire time at which the lease expires unless the lease is extended; wherein the load capacity allocated to the web crawler comprises a specified number of download requests per unit time; and
    upon arrival of a respective lease's lease update time and satisfaction of a predefined condition, automatically updating the respective lease between a respective web crawler of the plurality of web crawlers and a respective web host of the plurality of web hosts by granting the web crawler an updated share of the web host's maximum allowed load level, the updated lease having an updated lease expire time later than the lease update time;
    wherein creating the lease includes limiting the load capacity allocated to the requesting web crawler such that a sum of the load capacity allocated to each of the web crawlers having a lease with the requested web host is no greater than the requested web host's maximum allowed load level.

2. The method of claim 1, further comprising:
    releasing allocated load capacity from one or more of the plurality of web crawlers thereby making the released load capacity available to other requesting web crawlers if the one or more of the plurality of web crawlers submits a capacity releasing request prior to arrival of its lease's lease update time.

3. The method of claim 1, further comprising:
    assigning each of the web crawlers a respective priority indicating a relative priority of the web crawler's capacity request for a web host compared with priorities of other competing web crawlers' capacity requests for the web host, wherein the load capacity allocated to each of the requesting web crawlers is a function of the web crawler's respective priority and an unallocated portion, if any, of the web host's maximum allowed load level.

4. The method of claim 1, wherein the predefined condition includes no new capacity request having been received from the web crawler;
    further including updating the lease according to a new capacity request submitted by the web crawler.

5. The method of claim 4, wherein the step of updating the lease according to a new capacity request further comprises:
    if the new capacity request is a capacity releasing request, releasing from the web crawler its allocated load capacity, nullifying the lease's current lease update time and making the released load capacity available to other requesting web crawlers; and
    if the new capacity request is a capacity acquiring request, granting the web crawler an updated share of the web host's maximum load level and assigning the lease a new lease update time.

6. The method of claim 5, wherein the new lease update time is a lease update time at which the lease is extended for a predefined time period if the web crawler has not submitted an express capacity acquiring request.

7. The method of claim 4, wherein the step of updating the lease further comprises releasing from the web crawler its allocated load capacity and making the released load capacity available to other requesting web crawlers.

8. The method of claim 1, including:
    grouping web hosts of the plurality of web hosts according to their IP addresses and assigning each group a unique group name and a group maximum allowed load level; and
    while creating leases between a group of web hosts having a same group name and a group of web crawlers, limiting total load capacity allocated to the web crawlers to the group maximum allowed load level with respect to the web hosts of the group.

9. The method of claim 8, wherein the lease creating and limiting step includes:
    for each group of web hosts, identifying a plurality of web crawlers that each has at least one lease with at least one member host in the group; and
    assigning to each identified web crawler a share of the group's group maximum allowed load level according to a priority assigned to the web crawler.

10. A system for limiting requests to a web host by multiple competing web crawlers of a search engine, comprising:
    one or more central processing units for executing programs; and
    a host load allocation module executable by the one or more central processing units, the module comprising:
        instructions for creating a lease between the web host and a requesting web crawler, the lease including an identity of the requesting web crawler, an identity of the web host, a load capacity allocated to the requesting web crawler and a lease update time prior to a lease expire time at which the lease expires unless the lease is extended; wherein the web host has a specified maximum allowed load level comprising a predefined number of web crawler download requests per unit time, and the load capacity allocated to the requesting web crawler comprises a specified number of download requests per unit time; the instructions for creating a lease including:

instructions for limiting the load capacity allocated to the requesting web crawler such that a sum of load capacity allocated to each of the web crawlers having a lease with the web host is no greater than the web host's maximum allowed load level;

instructions for upon arrival of the lease's lease update time and satisfaction of a predefined condition, automatically updating the lease between the web host and the web crawler at the lease's lease update time by granting the web crawler an updated share of the web host's maximum allowed load level, the updated lease having an updated lease expire time later than the lease update time;

instructions for terminating the lease between the web host and the web crawler at the lease's lease update time if the predefined condition is not satisfied or per the web crawler's request; and a plurality of data structures storing information of a plurality of web hosts, a plurality of web crawlers and a plurality of leases between the web hosts and the web crawlers.

11. The system of claim 10, wherein the terminating instructions further comprise:

instructions for releasing from the web crawler its allocated load capacity thereby making the released load capacity available to other requesting web crawlers if the web crawler submits a capacity releasing request prior to arrival of its lease's lease update time.

12. The system of claim 10, wherein the information of the plurality of web crawlers includes a respective priority assigned to each of the multiple competing web crawlers that indicates a relative priority of the respective web crawler's request for the web host compared with priorities of other competing web crawlers' requests for the web host, and wherein the load capacity allocated to each of the respective web crawlers is a function of the respective web crawler's respective priority and an unallocated portion, if any, of the web host's maximum load level.

13. The system of claim 10, wherein the updating instructions further comprise:

instructions for updating the lease according to a new capacity request submitted by the web crawler.

14. The system of claim 13, wherein the instructions for updating the lease according to a new capacity request further comprises:

instructions for releasing from the web crawler its allocated load capacity, nullifying the lease's current lease update time and making the released load capacity available to other requesting web crawlers in the case that the new capacity request is a capacity releasing request; and instructions for granting the web crawler an updated share of the web host's maximum load level and assigning the lease a new lease update time in the case that the new capacity request is a capacity acquiring request.

15. The system of claim 14, wherein the new lease update time is a lease update time at which the lease is extended for a predefined time period in the case that the web crawler has not submitted an express capacity acquiring request.

16. The system of claim 13, wherein the host allocation module further includes:

instructions for releasing from the web crawler its allocated load capacity and making the released load capacity available to other requesting web crawlers at the lease expire time.

17. The system of claim 10, including:

instructions for grouping a plurality of web hosts according to their IP addresses and assigning each group a unique group name and a group maximum allowed load level; and instructions for creating leases between a group of web hosts and a group of web crawlers and limiting total load capacity allocated to the web crawlers to the group maximum allowed load level with respect to the web hosts of the group.

18. The system of claim 17, wherein the lease creating and limiting instructions include:

instructions for identifying a plurality of web crawlers that each has at least one lease with at least one member host in a group of web hosts; and instructions for assigning to each identified web crawler a share of the group's group maximum allowed load level according to a priority assigned to the web crawler.

19. A computer program product for use in conjunction with a computer system, the computer program product comprising a computer readable storage medium and a computer program mechanism for limiting requests to a web host by multiple competing web crawlers of a search engine, wherein the computer program mechanism is embedded in the computer readable storage medium, the computer program mechanism comprising:

instructions for creating a lease between the web host and a requesting web crawler, the lease including an identity of the requesting web crawler, an identity of the web host, a load capacity allocated to the requesting web crawler and a lease update time prior to a lease expire time at which the lease expires unless the lease is extended; wherein the web host has a specified maximum allowed load level comprising a predefined number of web crawler download requests per unit time, and the load capacity allocated to the requesting web crawler comprises a specified number of download requests per unit time, the instructions for creating a lease including:

instructions for limiting the load capacity allocated to the requesting web crawler such that a sum of load capacity allocated to each of the web crawlers having a respective lease with the web host is no greater than the web host's maximum allowed load level;

instructions for upon arrival of the lease update time and satisfaction of a predefined condition, automatically updating a lease between the web host and the web crawler at the lease update time by granting the web crawler an updated share of the web host's maximum allowed load level, the updated lease having an updated lease expire time later than the lease update time;

instructions for terminating a lease between the web host and the web crawler at the lease update time if the predefined condition is not satisfied or per the web crawler's request; and a plurality of data structures storing information of a plurality of web hosts, a plurality of web crawlers and a plurality of leases between the web hosts and the web crawlers.

20. The computer program product of claim 19, wherein the terminating instructions further comprise:

instructions for releasing from a web crawler its allocated load capacity thereby making the released load capacity available to other requesting web crawlers if the web crawler submits a capacity releasing request prior to arrival of its lease update time.

21. The computer program product of claim 19, wherein the information of the plurality of web crawlers includes a respective priority assigned to each of the web crawlers that indicates a relative priority of the web crawler's capacity request for a web host compared with priorities of other competing web crawlers' capacity requests for the web host, and wherein the load capacity allocated to each of the web crawlers is a function of the web crawler's respective priority and the web host's unallocated load capacity, if any.

22. The computer program product of claim 19, wherein the updating instructions further comprise:
   instructions for updating the lease according to a new capacity request submitted by the web crawler.

23. The computer program product of claim 22, wherein the instructions for updating the lease according to a new capacity request further comprises:
   instructions for releasing from the web crawler its allocated load capacity, nullifying the lease's current lease update time and making the released load capacity available to other requesting web crawlers in the case that the new capacity request is a capacity releasing request; and
   instructions for granting the web crawler an updated share of the maximum load level associated with the web host and assigning the lease a new lease update time in the case that the new capacity request is a capacity acquiring request.

24. The computer program product of claim 23, wherein the new lease update time is a lease update time at which the lease is extended for a predefined time period in the case that the web crawler has not submitted an express capacity acquiring request.

25. The computer program product of claim 22, wherein the computer program mechanism further:
   instructions for releasing from the web crawler its allocated load capacity and making the released load capacity available to other requesting web crawlers at the lease expire time.

26. The computer program product of claim 19, including:
   instructions for grouping a plurality of web hosts according to their IP addresses and assigning each group a unique group name and a group maximum allowed load level; and
   instructions for creating leases between a group of web hosts and a group of web crawlers and limiting total load capacity allocated to the web crawlers to the group maximum allowed load level with respect to the web hosts of the group.

27. The computer program product of claim 26, wherein the lease creating and limiting instructions include:
   instructions for identifying a plurality of web crawlers that each has at least one lease with at least one member host in a group of web hosts; and
   instructions for assigning to each identified web crawler a share of the group's group maximum allowed load level according to a priority assigned to the web crawler.

* * * * *